United States Patent
Yamashita et al.

(10) Patent No.: US 10,293,752 B2
(45) Date of Patent: May 21, 2019

(54) DISPLAY SYSTEM FOR WORK VEHICLE, DISPLAY CONTROL DEVICE, WORK VEHICLE, AND DISPLAY CONTROL METHOD

(71) Applicants: The University of Tokyo, Tokyo (JP); KOMATSU LTD., Tokyo (JP)

(72) Inventors: Atsushi Yamashita, Tokyo (JP); Soichiro Iwataki, Tokyo (JP); Hajime Asama, Tokyo (JP); Yuushi Oshikawa, Kyoto (JP); Takashi Noda, Hirakata (JP)

(73) Assignees: THE UNIVERSITY OF TOKYO, Toyko (JP); KOMATSU LTD., Tokyo (JP)

( * ) Notice: Subject to any disclaimer, the term of this patent is extended or adjusted under 35 U.S.C. 154(b) by 193 days.

(21) Appl. No.: 15/308,177

(22) PCT Filed: Aug. 28, 2014

(86) PCT No.: PCT/JP2014/072535
§ 371 (c)(1),
(2) Date: Nov. 1, 2016

(87) PCT Pub. No.: WO2016/031009
PCT Pub. Date: Mar. 3, 2016

(65) Prior Publication Data
US 2017/0050566 A1    Feb. 23, 2017

(51) Int. Cl.
*B60R 1/00* (2006.01)
*H04N 5/232* (2006.01)
(Continued)

(52) U.S. Cl.
CPC ............... *B60R 1/002* (2013.01); *B60R 1/00* (2013.01); *E02F 9/261* (2013.01);
(Continued)

(58) Field of Classification Search
CPC ...................................................... B60R 1/002
See application file for complete search history.

(56) References Cited

U.S. PATENT DOCUMENTS

| 2003/0108222 A1 | 6/2003 | Sato et al. | |
| 2013/0182066 A1* | 7/2013 | Ishimoto | H04N 7/181 |
| | | | 348/38 |

(Continued)

FOREIGN PATENT DOCUMENTS

| JP | 2003-196645 A | 7/2003 |
| JP | 2012-74929 A | 4/2012 |

(Continued)

OTHER PUBLICATIONS

The International Search Report for the corresponding international application No. PCT/JP2014/072535, dated Nov. 25, 2014.

*Primary Examiner* — James M Pontius
(74) *Attorney, Agent, or Firm* — Global IP Counselors, LLP

(57) ABSTRACT

A first capturing image unit mounted on a vehicle body captures an image of surroundings of a work vehicle. A second capturing image unit is disposed above the work implement and captures an image of an area in front of the work implement. A first image generation unit generates, from the image captured by the first capturing image unit, a surroundings composite image, which depicts the surroundings of the work vehicle in a bird's-eye view and is synthesized with a vehicle model depicting the work vehicle. A second image generation unit generates, from the image captured by the second image capturing unit, a work implement composite image, which depicts the area in front of the work implement and is synthesized with the vehicle model and the surroundings composite image. A display unit displays a display image including the vehicle model, the (Continued)

surroundings composite image, and the work implement composite image.

20 Claims, 11 Drawing Sheets

(51) Int. Cl.
*H04N 5/247* (2006.01)
*H04N 5/265* (2006.01)
*H04N 7/18* (2006.01)
*E02F 9/26* (2006.01)

(52) U.S. Cl.
CPC ..... *H04N 5/23238* (2013.01); *H04N 5/23254* (2013.01); *H04N 5/23293* (2013.01); *H04N 5/247* (2013.01); *H04N 5/265* (2013.01); *H04N 7/181* (2013.01); *B60R 2300/105* (2013.01); *B60R 2300/303* (2013.01); *B60R 2300/607* (2013.01)

(56) References Cited

U.S. PATENT DOCUMENTS

| | | |
|---|---|---|
| 2014/0085466 A1 | 3/2014 | Moriyama et al. |
| 2014/0218531 A1 | 8/2014 | Michiguchi et al. |
| 2015/0138356 A1 | 5/2015 | Kowatari et al. |

FOREIGN PATENT DOCUMENTS

| | | |
|---|---|---|
| JP | 2013-253402 A | 12/2013 |
| JP | 2013-253426 A | 12/2013 |
| JP | 2014-68308 A | 4/2014 |
| WO | 2013/031161 A1 | 3/2013 |

* cited by examiner

DISPLAY SYSTEM FOR WORK VEHICLE, DISPLAY CONTROL DEVICE, WORK VEHICLE, AND DISPLAY CONTROL METHOD

CROSS-REFERENCE TO RELATED APPLICATIONS

This application is a U.S. National stage application of International Application No. PCT/JP2014/072535, filed on Aug. 28, 2014.

BACKGROUND

Field of the Invention

The present invention relates to a display system for a work vehicle, a display control device, a work vehicle, and a display control method.

Background Information

A display system for providing images of the surroundings of a work vehicle to an operator is known in the prior art. For example, a plurality of image capturing devices for capturing images of the frontward and rearward and the left and right of a vehicle are mounted on a dump truck as a part of the display system in Japanese Patent Laid-open No. 2013-253426. Bird's-eye view images as seen from above the dump truck of the surroundings thereof are generated by synthesizing the images from the plurality of image capturing devices in the display system.

SUMMARY

A work implement such as a blade may be mounted on a vehicle body in a work vehicle such as a bulldozer. It is preferable to be able to grasp the conditions of the area in front of the work implement in order to grasp the working conditions for such a work vehicle. For example, it is preferable that the amount of earth carried by the blade is understood in a bulldozer.

However, because the area in front of the work implement is a blind spot to the operator inside the operating cabin, it is difficult to directly grasp the amount of earth in a visual manner. As a result, the operator normally determines the amount of earth being carried by the work implement from the engine sound, vibration of the vehicle body, or the amount of earth spilled from the work implement. However, this type of sensory determination is not easy because advanced experience is required.

Moreover, a technique for operating a work vehicle remotely has been known in recent years. For example, an operator operates a controller from a location away from the work site while viewing an image from a camera mounted in the operating cabin of the work vehicle. The operator is not able to sense the aforementioned engine sound or vibration of the vehicle body when operating the work vehicle remotely in this manner. As a result, it is not easy to determine the amount of earth carried by the work implement even if the operator is experienced.

However according to the aforementioned display system, the operator is able to grasp the conditions of the surroundings of the work vehicle from the bird's-eye view image. However, a work vehicle provided with a work implement is different from a dump truck in that the area in front of the work implement becomes a blind spot as seen from an image capturing device mounted on the vehicle body. As a result, the conditions of the area in front of the work implement cannot be accurately represented in a bird's-eye view image.

Therefore, even if the conditions of the surroundings of the work vehicle can be understood, it is difficult to understand the conditions of the area in front of the work implement in a bird's-eye view image according to the aforementioned display system.

An object of the present invention is to provide a display system for a work vehicle, a display control device, a work vehicle, and a display control method that allow for the conditions of the surroundings of the work vehicle and the conditions in front of the work implement to be easily understood.

A display system for a work vehicle according to a first aspect of the present invention is a system for displaying the surrounding environment of a work vehicle having a vehicle body and a work implement disposed on the front of the vehicle body. The display system is provided with a first capturing image unit, a second image capturing unit, a first image generation unit, a second image generation unit, and a display unit. The first capturing image unit, which is mounted on the vehicle body, captures an image of the surroundings of the work vehicle. The second capturing image unit, which is disposed above the work implement, captures an image of an area in front of the work implement. The first image generation unit generates a surroundings composite image from the image captured by the first capturing image unit. The surroundings composite image depicts the surroundings of the work vehicle from a bird's eye view, and is synthesized with a vehicle model depicting the work vehicle. The second image generation unit generates a work implement composite image from the image captured by the second image capturing unit. The work implement composite image depicts an area in front of the work implement, and is synthesized with the vehicle model and the surroundings composite image. The display unit displays a display image that includes the vehicle model, the surroundings composite image, and the work implement composite image.

The vehicle model, the surroundings composite image depicting a bird's-eye view of the surroundings of the work vehicle, and the work implement composite image depicting the area in front of the work implement are synthesized in the display image in the display system for the work vehicle according to the present aspect. As a result, an operator is able to easily understand the conditions of the surroundings of the work vehicle and the conditions of the area in front of the work implement from the display image.

The display image preferably displays the work vehicle and the surroundings thereof in a three-dimensional manner as seen diagonally from in front and from above. In this case, the conditions of the area in front of the work implement can be understood more easily in comparison to a case in which the display image displays the work vehicle and the surroundings thereof in a two-dimensional manner as seen from directly above.

The first capturing image unit is preferably disposed so as to face outward with respect to the work vehicle. The second capturing image unit is disposed so as to face inward with respect to the work vehicle. In this case, the surroundings composite image can be generated with greater accuracy due to the first capturing image unit disposed so as to face outward with respect to the work vehicle. Moreover, the work implement composite image can be generated with greater accuracy without being blocked by the work implement due to the second capturing image unit disposed so as to face to inward with respect to the work vehicle.

The image captured by the second image capturing unit preferably includes the front surface of the work implement.

The second image generation unit generates the work implement composite image from the image of the front surface of the work implement captured by the second image capturing unit. The work implement composite image is synthesized with the front surface of the work implement of the vehicle model. In this case, the amount and position of a work object such as earth can be understood with greater accuracy due to the work implement composite image.

The image captured by the second image capturing unit preferably includes the ground surface located in front of the work implement. The second image generation unit generates the work implement composite image from the image of the ground surface captured by the second image capturing unit. The work implement composite image is synthesized with the ground surface located in front of the work implement of the vehicle model in the surroundings composite image. In this case, the amount and position of the work object such as earth can be understood with greater accuracy due to the work implement composite image.

The image captured by the second image capturing unit preferably includes an image depicting the front surface of the work implement and an image depicting the ground surface located in front of the work implement. The work implement composite image includes a first work implement composite image and a second work implement composite image. The second image generation unit generates the first work implement composite image from the image of the front surface of the work implement captured by the second image capturing unit. The second image generation unit generates the second work implement composite image from the image of the ground surface captured by the second image capturing unit. The first work implement composite image is synthesized with the front surface of the work implement of the vehicle model. The second work implement composite image is synthesized with the ground surface located in front of the work implement of the vehicle model in the surroundings composite image. In this case, the amount and position of the work object such as earth can be understood with greater accuracy due to the work implement composite image.

The first image generation unit preferably generates the surroundings composite image by projecting the image captured by the first capturing image unit onto a first projection plane. The first projection plane is disposed so as to enclose the vehicle model. In this case, the surroundings composite image can be generated by using the first projection plane.

The first projection plane is preferably hemispherical and has a mesh structure. In this case, the accuracy of the surroundings composite image can be improved.

The second image generation unit preferably generates the work implement composite image by projecting the image captured by the second image capturing unit onto a second projection plane. The second projection plane is disposed on the front surface of the work implement of the vehicle model and on the ground surface located in front of the work implement of the vehicle model. In this case, the work implement composite image can be generated by using the second projection plane.

The second projection plane preferably includes a first plane along the front surface of the work implement of the vehicle model and a second plane along the ground surface located in front of the work implement of the vehicle model. In this case, the work implement composite image can be generated more easily.

The first capturing image unit preferably includes a plurality of image capturing devices attached to the vehicle body. In this case, the surroundings composite image can be generated by synthesizing a plurality of images captured by the plurality of image capturing devices. As a result, the accuracy of the surroundings composite image can be improved.

The plurality of image capturing devices preferably includes a first image capturing device for capturing an image in front of the vehicle body, a second image capturing device for capturing an image to the left of the vehicle body, a third image capturing device for capturing an image to the right of the vehicle body, and a fourth image capturing device for capturing an image to the rear of the vehicle body. In this case, the surroundings composite image is generated by synthesizing the images of the front and rear and left and right of the vehicle body. As a result, the accuracy of the surroundings composite image can be improved.

The image capturing devices are preferably fish-eye lens cameras. In this case, a surroundings composite image can be generated with good accuracy with a smaller number of image capturing devices by using fish-eye lens cameras with a wide angle of view.

A display control device for a work vehicle according to a second aspect of the present invention is a device for displaying the surrounding environment of a work vehicle having a vehicle body and a work implement disposed on the front of the vehicle body. The display control device is provided with an image acquiring unit, a first image generation unit, a second image generation unit, and a display unit. The image acquiring unit acquires an image of the surroundings of the vehicle body from the first capturing image unit mounted on the vehicle body. Moreover, the image acquiring unit acquires an image of an area in front of the work implement from the second image capturing unit disposed above the work implement. The first image generation unit generates a surroundings composite image from the image captured from the first capturing image unit. The surroundings composite image depicts the surroundings of the work vehicle from a bird's eye view, and is synthesized with a vehicle model depicting the work vehicle. The second image generation unit generates a work implement composite image from the image acquired from the second capturing image unit. The work implement composite image depicts an area in front of the work implement, and is synthesized with the vehicle model and the surroundings composite image. The display unit displays a display image that includes the vehicle model, the surroundings composite image, and the work implement composite image.

The vehicle model, the surroundings composite image displaying a bird's-eye view of the surroundings of the work vehicle, and the work implement composite image depicting the area in front of the work implement are synthesized in a display image in the display control device for the work vehicle according to the present aspect. As a result, an operator is able to easily understand the conditions of the surroundings of the work vehicle and the conditions of the area in front of the work implement from the display image.

A work vehicle according to a third aspect of the present invention is provided with a vehicle body, a work implement, a first capturing image unit, and a second image capturing unit. The work implement is disposed in front of the vehicle body. The first capturing image unit, which is mounted on the vehicle body, captures an image of the surroundings of the work vehicle. The second capturing image unit, which is disposed above the work implement, captures an image of an area in front of the work implement. The first capturing image unit is disposed so that the image capturing direction faces outward with respect to the vehicle body. The second capturing image unit is disposed so that the image capturing direction faces inward with respect to the vehicle body.

The second capturing image unit is disposed above the work implement and is disposed so that the image capturing direction faces inward with respect to the vehicle body in the work vehicle according to the present aspect. As a result, an image of at least a portion of the work implement and an image of an area in front of the work implement joined to the work implement can be captured. As a result, an image of the surrounding environment of the work vehicle can be captured without a blind spot.

A display control method for a work vehicle according to a fourth aspect of the present invention is a method for displaying an environment of the work vehicle having a vehicle body and a work implement attached to the vehicle body. The display control method includes first to fifth steps. In the first step, an image of the surroundings of the vehicle body are acquired from a first capturing image unit mounted on the vehicle body. In the second step, an image of an area in front of the work implement are acquired from a second image capturing unit disposed above the work implement. In the third step, a surroundings composite image is generated from the image acquired from the first capturing image unit. The surroundings composite image depicts the surroundings of the work vehicle from a bird's eye view, and is synthesized with a vehicle model depicting the work vehicle. In the fourth step, a work implement composite image is generated from the image acquired by the second capturing image unit. The work implement composite image depicts an area in front of the work implement, and is synthesized with the vehicle model and the surroundings composite image. In the fifth step, a display image that includes the vehicle model, the surroundings composite image, and the work implement composite image is displayed.

The vehicle model, the surroundings composite image depicting a bird's-eye view of the surroundings of the work vehicle, and the work implement composite image depicting the area in front of the work implement are synthesized in the display image in the display control method for the work vehicle according to the present aspect. As a result, an operator is able to easily understand the conditions of the surroundings of the work vehicle and the conditions of the area in front of the work implement from the display image.

According to the present invention, a display system for a work vehicle, a display control device, a work vehicle, and a display control method are provided that allow for the conditions of the surroundings of the work vehicle and the conditions of the area in front of the work implement to be easily understood.

DETAILED DESCRIPTION OF EMBODIMENT(S)

Figure 1:
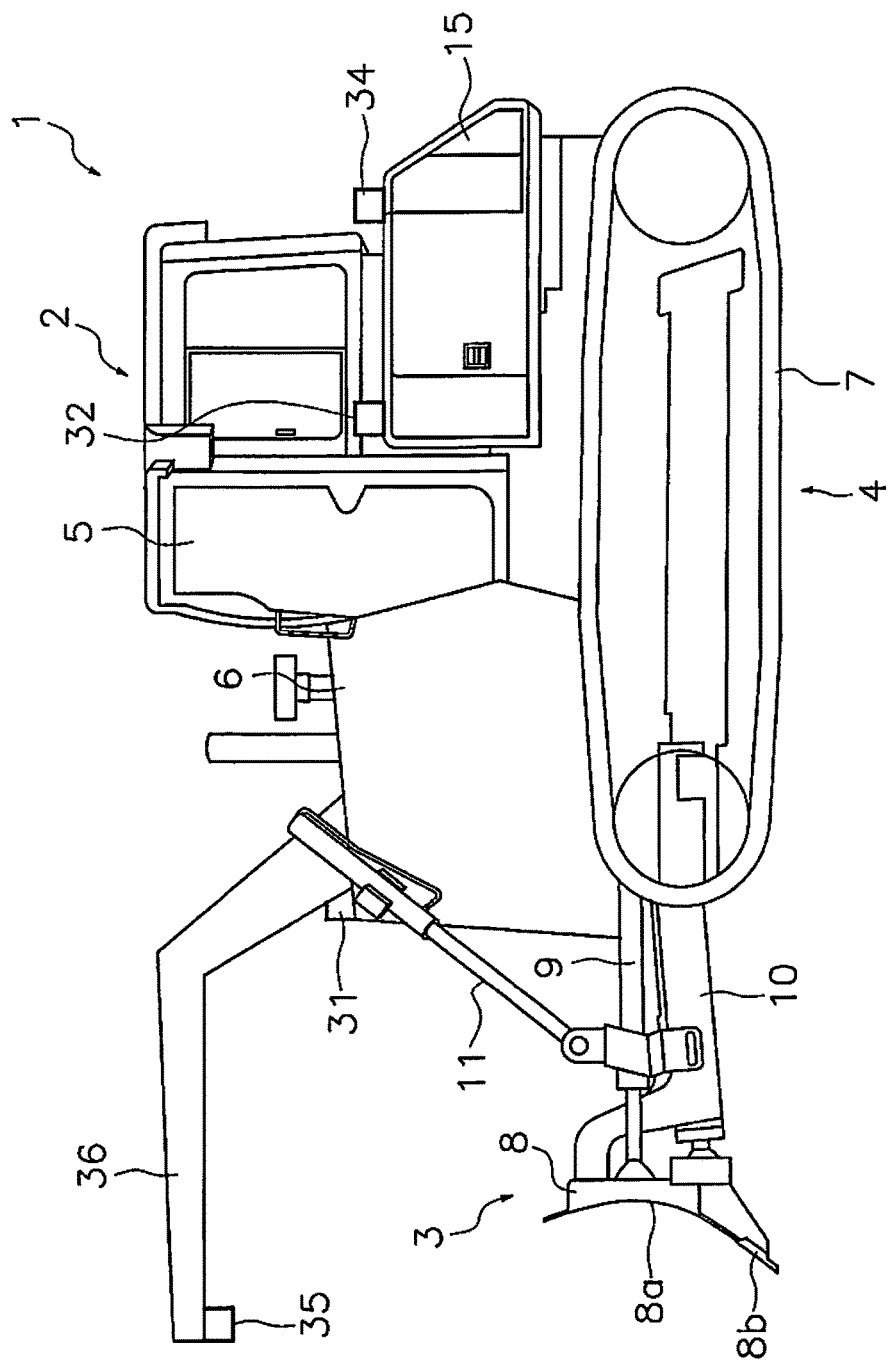
FIG. 1 is a side surface view of a work vehicle according to an embodiment.

The following is a description of a display system for a work vehicle according to the present embodiment with reference to the drawings. The display system according to the present embodiment is a system for displaying the surrounding environment of a work vehicle 1 as illustrated in FIG. 1. The work vehicle 1 is a bulldozer according to the present embodiment. The work vehicle 1 has a vehicle body 2 and a work implement 3 disposed in front of the vehicle body 2.

The vehicle body 2 has a travel device 4, an operating cabin 5, and an engine room 6. The travel device 4 is a device for causing the work vehicle 1 to travel. The travel device 4 has a crawler belt 7. The work vehicle 1 travels due to the crawler belt 7 being driven. The engine room 6 is disposed in front of the operating cabin 5. An engine and a hydraulic pump and the like, which are not included in the figures, are disposed inside the engine room 6.

The work implement 3 is provided in front of the engine room 6. The work implement 3 includes a blade 8, hydraulic cylinders 9 and II, and an arm 10. The blade 8 is supported on the vehicle body 2 via the arm 10. The blade 8 has a front surface plate 8a. The front surface plate 8a has the shape of a curved surface that is recessed with respect to the forward direction of the vehicle. A cutting edge 8b is provided on the lower end part of the front surface plate 8a. The blade 8 is provided in a manner that allows for swinging in the up-down direction. The hydraulic cylinders 9 and II change the orientation of the blade 8. A large portion of the front surface plate 8a is tilted to the rear and the front surface of the front surface plate 8a can be seen in a plan view when the blade 8 is in a normal orientation. The work implement 3 is used for work such as excavating, earth moving, or ground leveling. The work implement 3 excavates the ground surface and the like with the cutting edge 8b of the blade 8 and loads and carries the excavated sand and dirt and the like on the front surface plate 8a.

Figure 2:
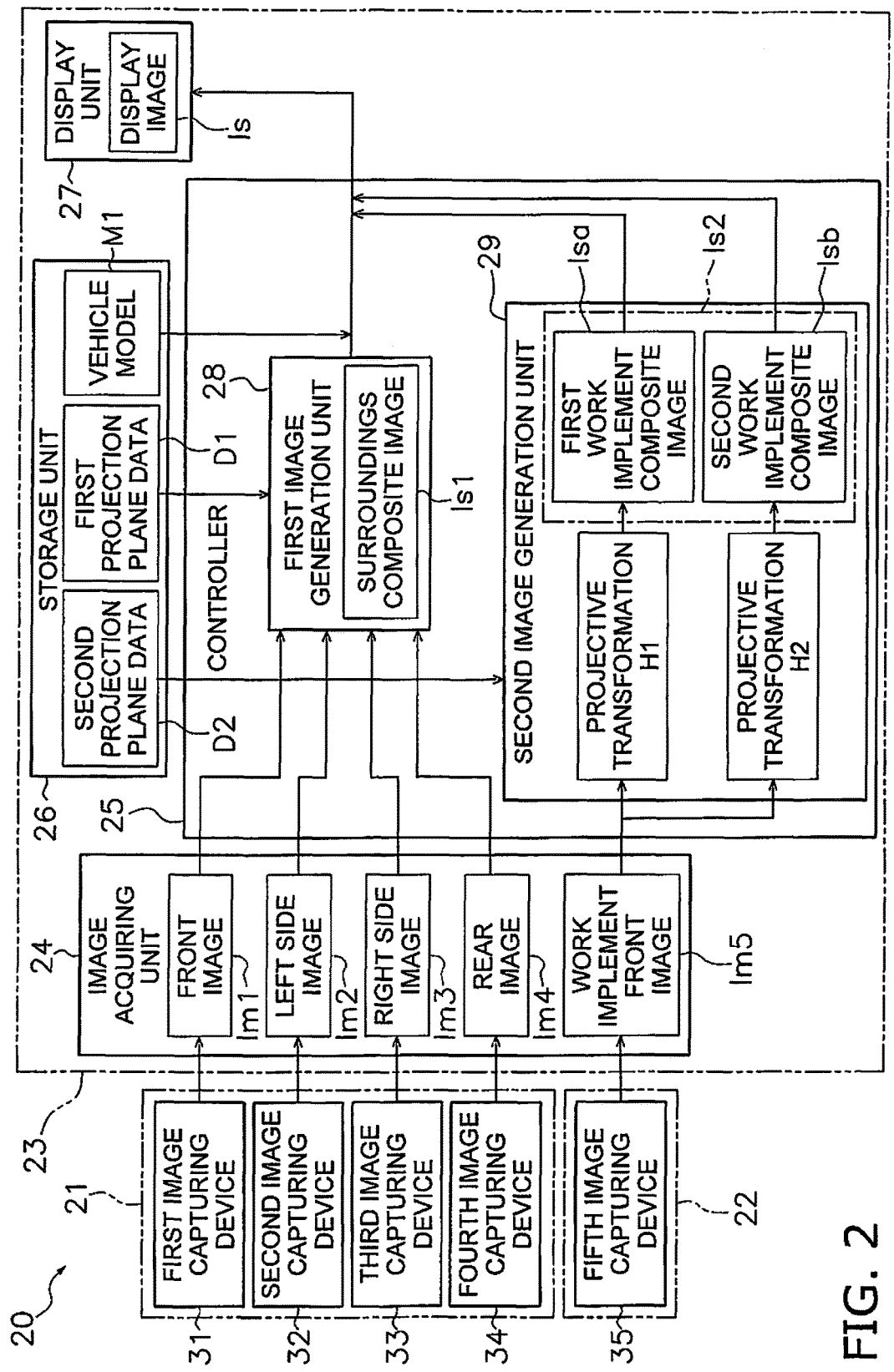
FIG. 2 is a block diagram illustrating a configuration of a display system according to an embodiment and illustrating a processing flow of the display system.

FIG. 2 is a block diagram illustrating a configuration of a display system 20 and a processing flow of the display system 20. As illustrated in FIG. 2, the display system 20 is provided with a first capturing image unit 21, a second image capturing unit 22, and a display control device 23. The first capturing image unit 21 is mounted on the vehicle body 2. The first capturing image unit 21 is disposed to face outward with respect to the work vehicle 1 and captures images of the surroundings of the work vehicle 1. The second image capturing unit 22 is disposed above the work implement 3. The second image capturing unit 22 is disposed so as to face inward with respect to the work vehicle 1 and captures images of an area in front of the work implement 3 including the front surface plate 8a of the work implement 3. Facing outward signifies that the optical axis of the image capturing device faces the direction away from the vehicle body 2 with respect to the vertical direction.

Further, facing inward signifies that the optical axis of the image capturing device faces the direction approaching the vehicle body 2 with respect to the vertical direction.

Specifically, the first capturing image unit 21 includes first to fourth image capturing devices 31 to 34 which are attached to the vehicle body 2. The first to fourth image capturing devices 31 to 34 are fish-eye lens cameras. As illustrated in FIG. 1, the first image capturing device 31 is attached to a front part of the vehicle body 2. The first image capturing device 31 captures images in front of the vehicle body 2. The second image capturing device 32 is attached to a left side part of the vehicle body 2. The second image capturing device 32 captures images to the left of the vehicle body 2. Although omitted from FIG. 1, the third image capturing device 33 is attached to a right side part of the vehicle body 2. The third image capturing device 33 captures images to the right of the vehicle body 2. The fourth image capturing device 34 is attached to a rear part of the vehicle body 2. The fourth image capturing device 34 captures images to the rear of the vehicle body 2. The image capturing directions of the first to fourth image capturing devices 31 to 34 face outward from the vehicle body 2, and the depression angle is 0 degrees.

The second image capturing unit includes a fifth image capturing device 35. The fifth image capturing device 35 is a camera including a lens with a normal angle of view. The fifth image capturing device 35 is disposed further to the front than the first image capturing device 31. The fifth image capturing device 35 is disposed above and further to the front than the work implement 3. Specifically, the fifth image capturing device 35 is disposed further to the front than the upper edge of the blade 8. The fifth image capturing device 35 is disposed higher than the upper edge of the blade 8. The fifth image capturing device 35 is supported on an arm member 36. The arm member 36 is attached to the vehicle body 2 and extends forward from the vehicle body 2. The fifth image capturing device 35 is attached to a tip end part of the arm member 36. The fifth image capturing device 35 captures images in a direction inclined toward the vehicle with respect to the vertical direction as seen in a side view of the vehicle. The image capturing surface area of the front surface of the blade 8 can be increased by capturing images in the direction inclined toward the vehicle.

The first capturing image unit 21 and the second image capturing unit 22 are configured to enable wired or wireless communication with the display control device 23. The first capturing image unit 21 and the second image capturing unit 22 send captured image data to the display control device 23.

The display control device 23 generates a display image Is for displaying the surrounding environment of the work vehicle 1 on the basis of the image data captured by the first capturing image unit 21 and the second image capturing unit 22. The display control device 23 has an image acquiring unit 24, a controller 25, a storage unit 26, and a display unit 27.

The image acquiring unit 24 is a device for carrying out wired or wireless communication with the first capturing image unit 21 and the second image capturing unit 22. The image acquiring unit 24 acquires image data of the surroundings of the vehicle body 2 from the first capturing image unit 21. Moreover, the image acquiring unit 24 acquires image data of the area in front of the work implement 3 from the second image capturing unit 22.

The controller 25 is configured with a computation device such as a CPU. The controller 25 generates the display image Is from the images captured by the first capturing image unit 21 and the second image capturing unit 22. The generation of the display image Is is explained in greater detail below.

The storage unit 26 is configured with a memory such as a RAM or a ROM, or with a storage device such as a hard disk. The storage unit 26 stores various types of data and programs used for generating the display image Is.

The display unit 27 is configured with a display such as a CRT, a LCD, or an OELD. However, the display unit 27 is not limited to the aforementioned displays and may be another type of display. The display unit 27 displays the display image Is on the basis of an output signal from the controller 25.

The generation of the display image Is will be explained in greater detail next. First image capturing is carried out by the first to fifth image capturing devices 31 to 35. The image acquiring unit 24 acquires a front image Im1, a left side image Im2, a right side image Im3, and a rear image Im4 from the respective first to fourth image capturing devices 31 to 34. The front image Im1 is an image in frontward direction of the vehicle body 2. The left side image Im2 is an image in the leftward direction of the vehicle body 2. The right side image Im3 is an image in the rightward direction of the vehicle body 2. The rear image Im4 is an image in the rearward direction of the vehicle body 2. Moreover, the image acquiring unit 24 acquires a work implement front image Im5 from the fifth image capturing device 35. The work implement front image Im5 is an image in the frontward direction of the work implement 3 including the front surface plate 8*a* of the work implement 3.

The controller 25 has a first image generation unit 28 and a second image generation unit 29. The first image generation unit 28 generates a surroundings composite image Is1 from the images Im1 to Im4 captured by the first capturing image unit 21. The surroundings composite image Is1 is an image depicting the surroundings of the work vehicle 1 from a bird's-eye view, and is synthesized with a vehicle model M1. The vehicle model M1 is a model depicting the shape of the work vehicle 1 and data depicting the vehicle model M1 is stored in the storage unit 26.

The second image generation unit generates a work implement composite image Is2 from the work implement front image Im5 captured by the second image capturing unit 22. The work implement composite image Is2 is an image depicting an area in front of the work implement 3, and is synthesized with the vehicle model M1 and the surroundings composite image Is1.

Figure 3:
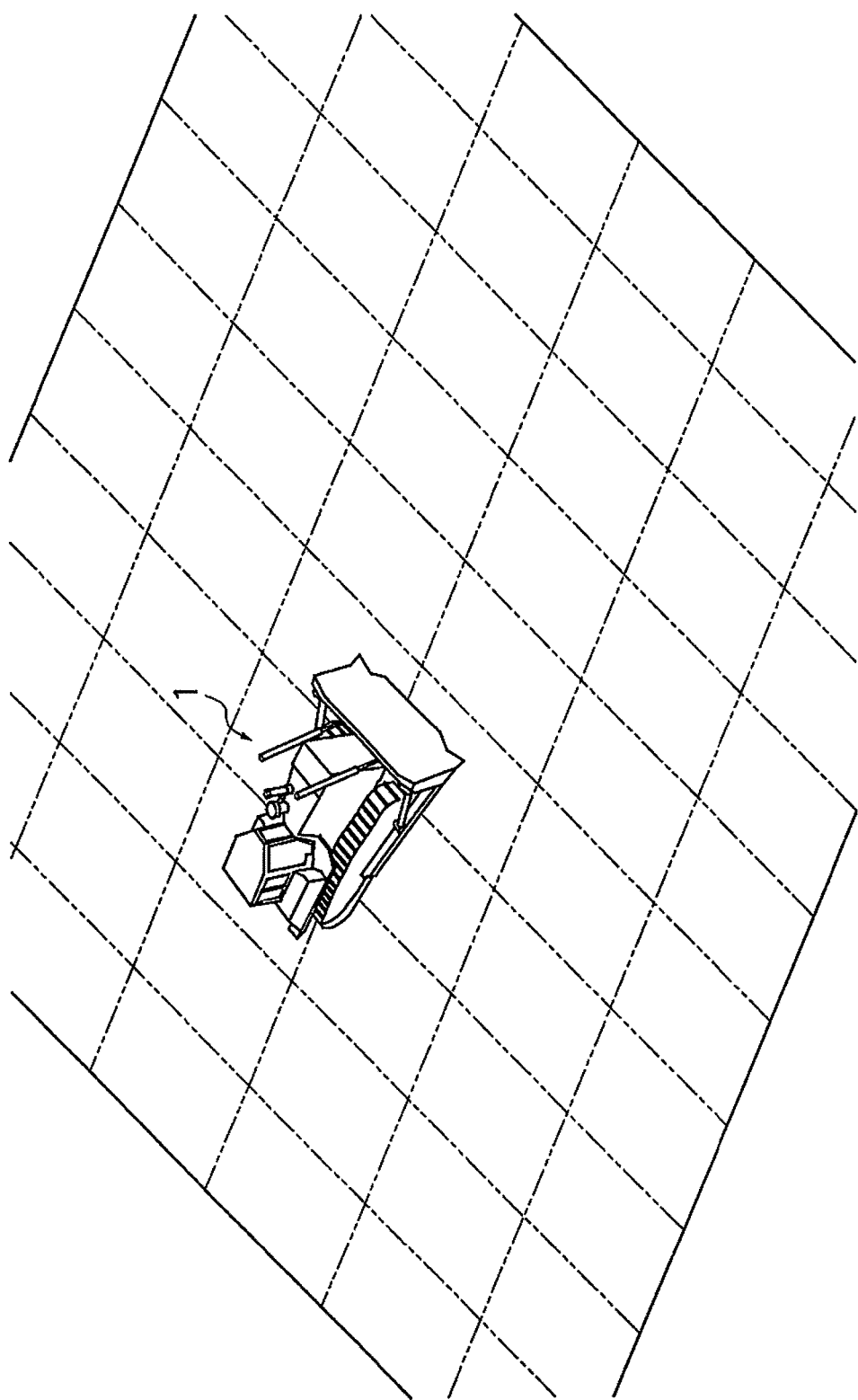
FIG. 3 is a perspective view illustrating actual conditions of the work vehicle.
Figure 4:
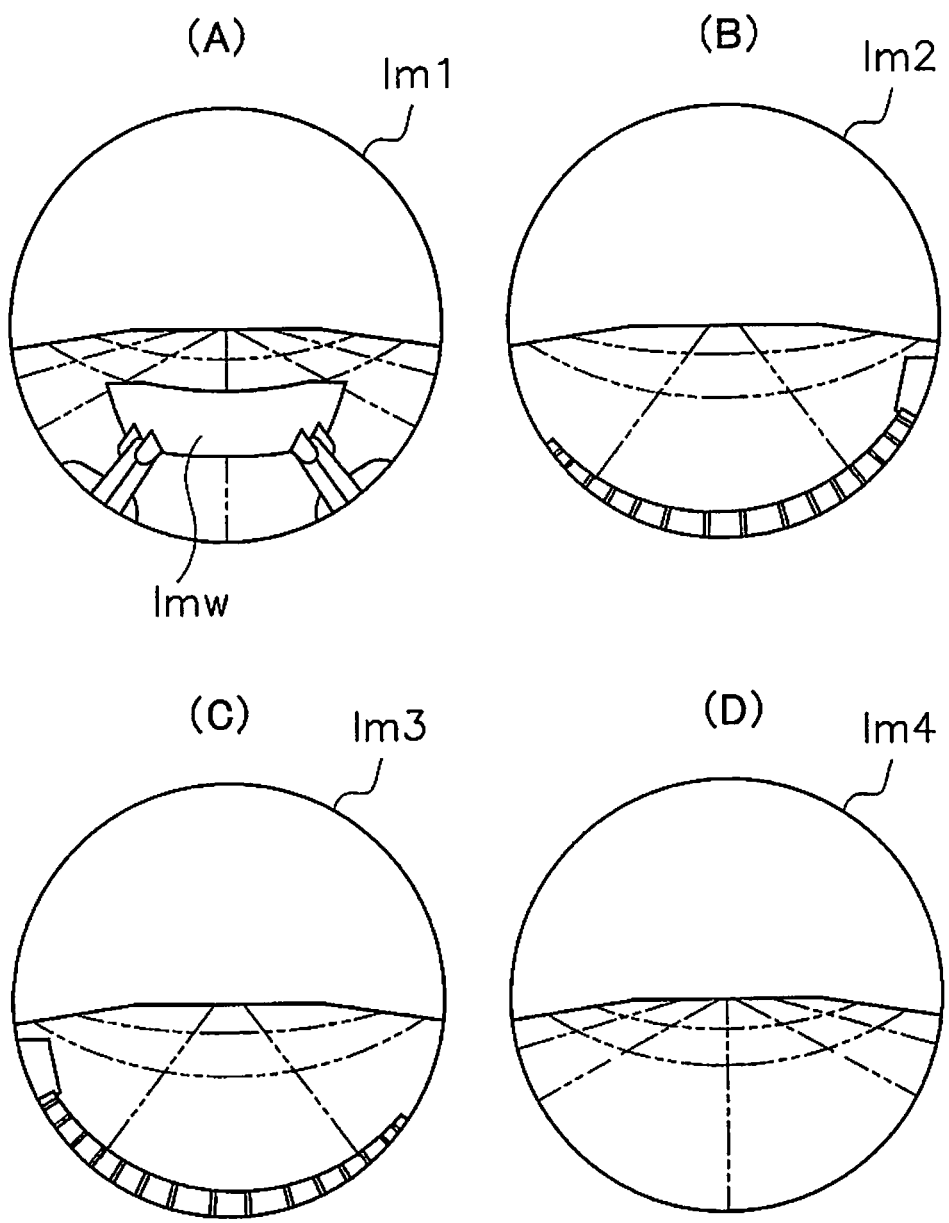
FIG. 4 illustrates examples of images captured by a first capturing image unit mounted on the work vehicle illustrated in FIG. 3.

FIG. 3 is a perspective view illustrating actual conditions of the work vehicle 1. FIG. 4 illustrates examples of images captured by the first capturing image unit 21 mounted on the work vehicle 1 in the state illustrated in FIG. 3. Specifically, FIG. 4A is the front image Im1 captured by the first image capturing device 31. FIG. 4B is the left side image Im2 captured by the second image capturing device 32. FIG. 4C is the right side image Im3 captured by the third image capturing device 33. FIG. 4D is the rear image Im4 captured by the fourth image capturing device 34.

Figure 5:
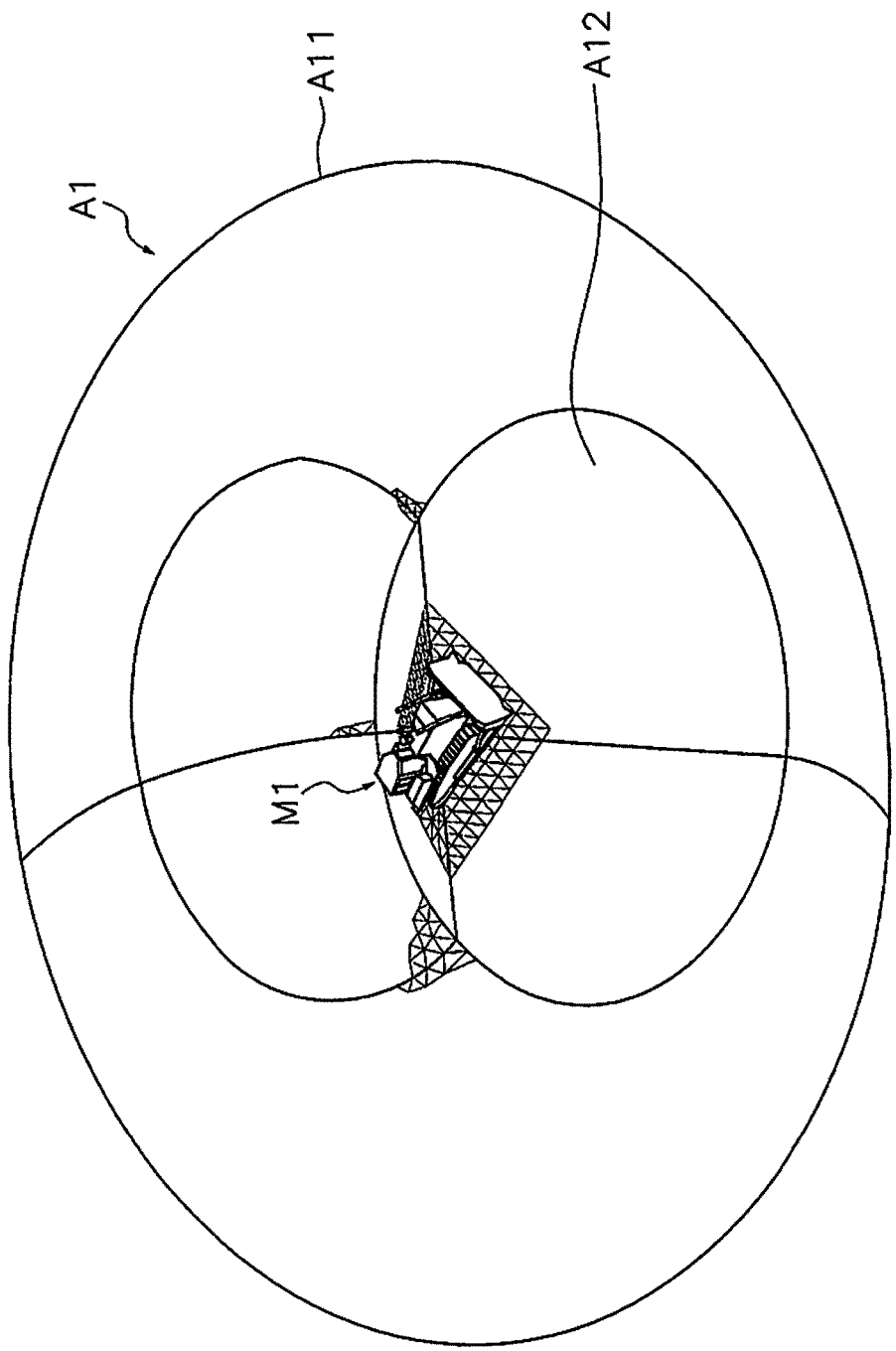
FIG. 5 illustrates an example of a first projection plane.

The first image generation unit 28 generates the surroundings composite image Is1 by projecting the images captured by the first capturing image unit 21 onto a first projection plane A1. FIG. 5 illustrates an example of the first projection plane A1. The first projection plane A1 is stored in the storage unit 26 as first projection plane data D1.

As illustrated in FIG. 5, the first projection plane A1 has a hemispherical curved surface A11 that encloses the vehicle model M1, and a flat surface A12 corresponding to the ground surface. The vehicle model M1 is disposed on the flat surface A12. The first projection plane A1 has a mesh structure and the first image generation unit 28 generates the surroundings composite image Is1 by projecting the images captured by the first capturing image unit 21 onto the first projection plane A1 by texture mapping. Only a portion of the mesh structure of the first projection plane A1 is illustrated in FIG. 5.

Figure 6:
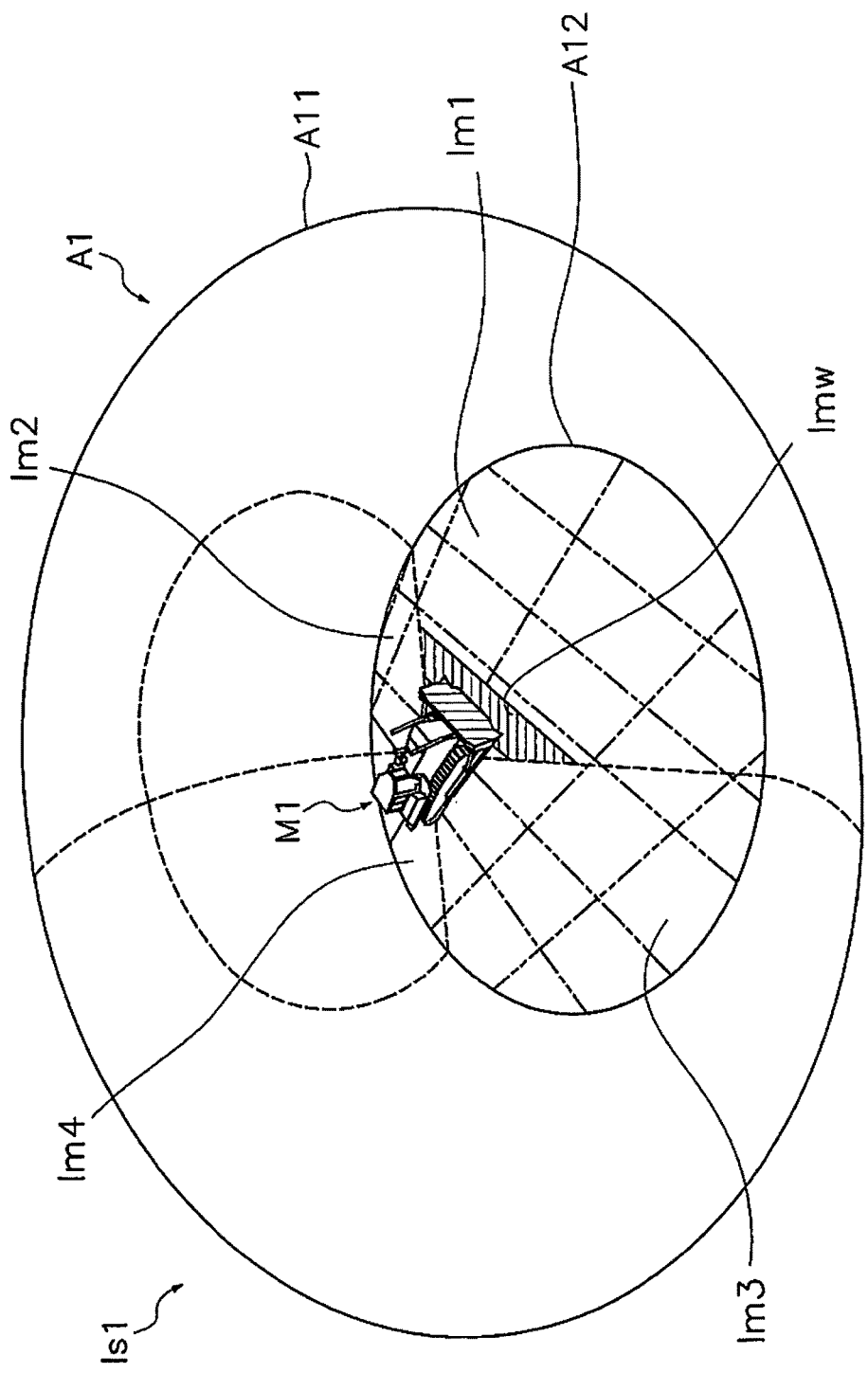
FIG. 6 illustrates an example of a surroundings composite image.

An example of the surroundings composite image Is1 generated by the first image generation unit 28 is illustrated in FIG. 6. As illustrated in FIG. 6, the front image Im1, the left side image Im2, the right side image Im3, and the rear image Im4 are projected on the first projection plane A1 and synthesized as the surroundings composite image Is1 of the vehicle model M1. Because an image of the rear part of the work implement 3 (see FIG. 4A) is photographed in the front image Im1, a portion in front of the work implement 3 including the front surface of the work implement 3 becomes a blind spot. As a result, an image Imw (diagonal line hatched portion in FIG. 6) in front of the work implement 3 is omitted or not displayed accurately in the surroundings composite image Is1 as illustrated in FIG. 6.

Figure 7:
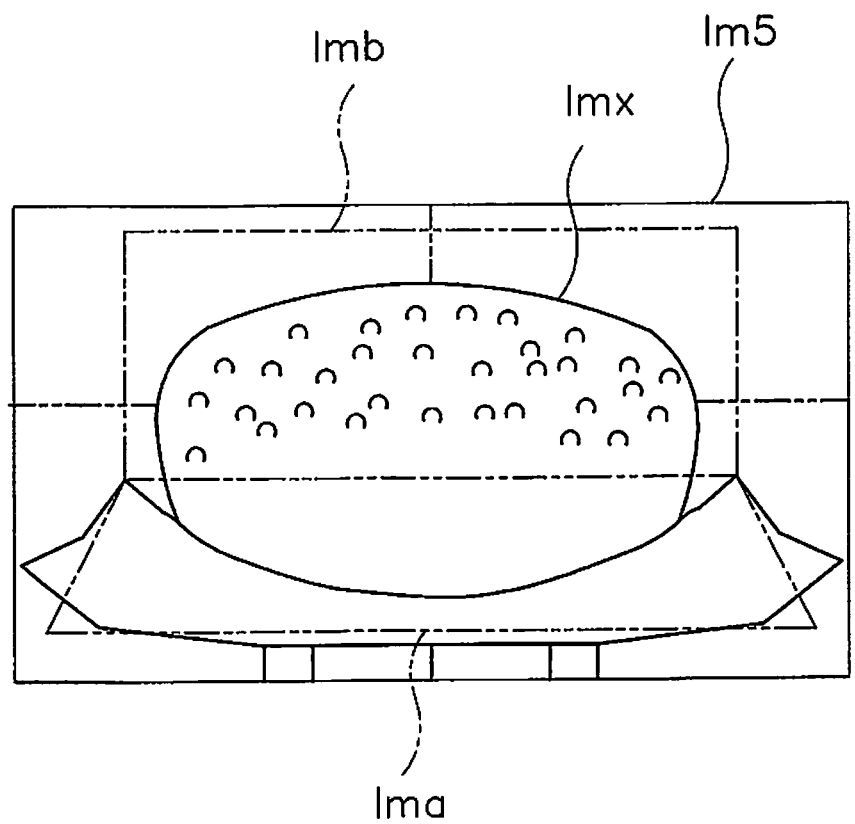
FIG. 7 illustrates an example of a work implement front image.
Figure 8:
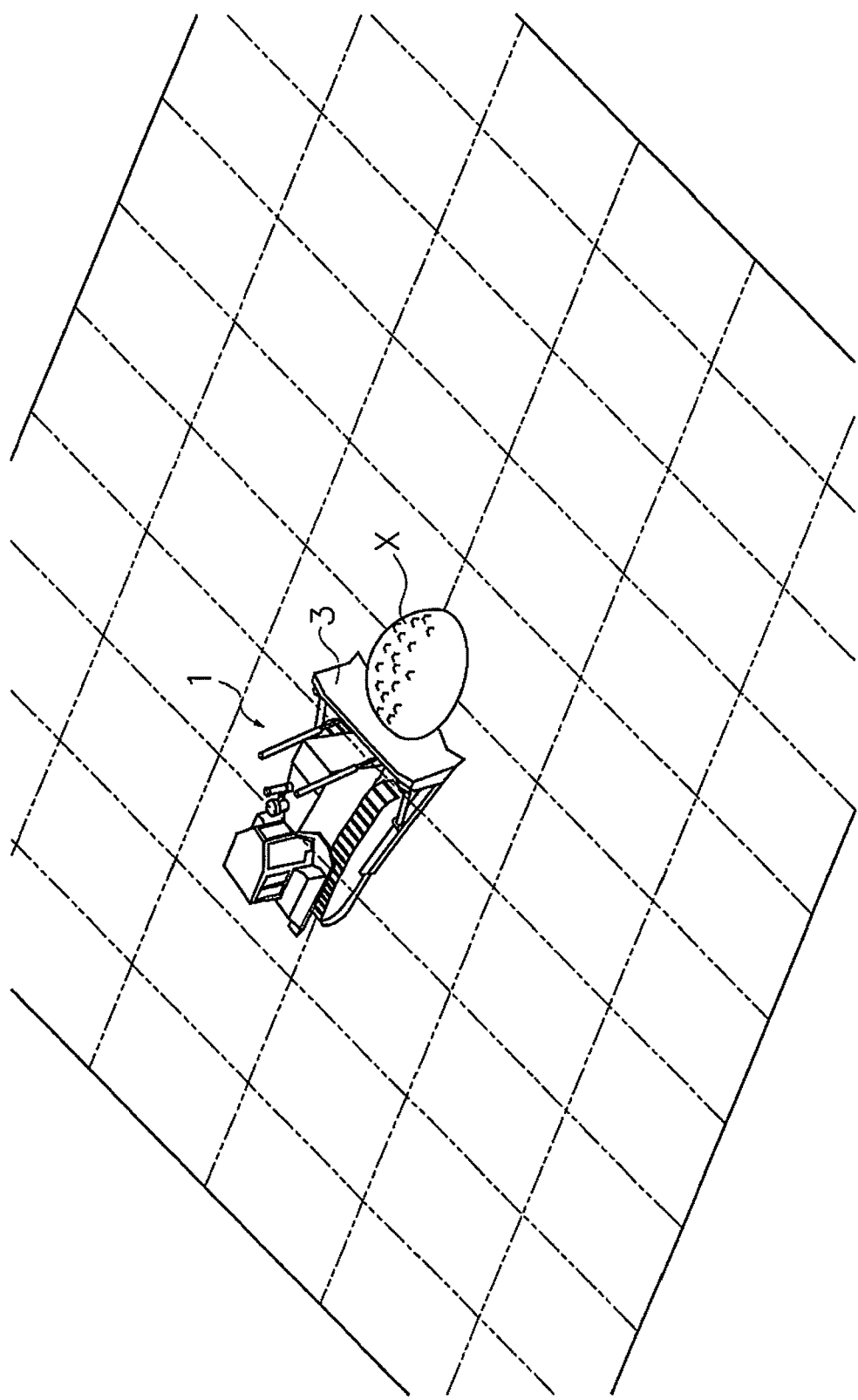
FIG. 8 is a perspective view illustrating actual conditions of the work vehicle.

FIG. 7 illustrates an example of the work implement front image Im5 captured by the second image capturing unit 22. As illustrated in FIG. 7, the work implement front image Im5 includes an image Ima depicting the front surface of the work implement 3, and an image Imb depicting the ground surface located in front of the work implement 3. When the actual work vehicle 1 is carrying a work object X such as sand and dirt as illustrated in FIG. 8, an image Imx depicting the work object X as illustrated in FIG. 7 is included in the work implement front image Im5.

Figure 9:
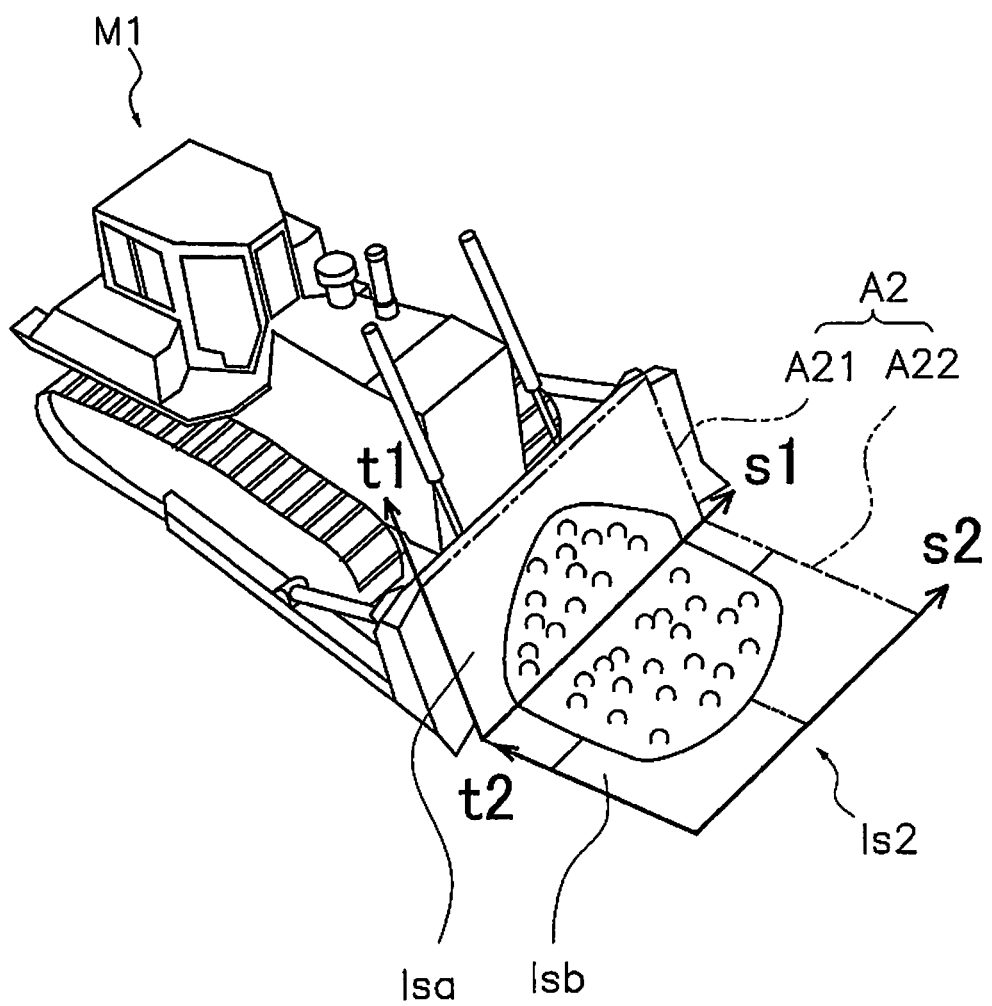
FIG. 9 illustrates processing for generating a work implement composite image by a second image generation unit.

The second image generation unit 29 generates the work implement composite image Is2 by projecting the work implement front image Im5 captured by the second image capturing unit 22 onto a second projection plane A2 as illustrated in FIG. 9. The second projection plane A2 is disposed in front of the work implement 3 of the vehicle model M1 and on the ground surface located in front of the work implement 3 of the vehicle model M1. Specifically, the second projection plane A2 includes a first plane A21 and a second plane A22. The first plane A21 is disposed along the front surface of the work implement 3 of the vehicle model M1. The second plane A22 is disposed along the ground surface located in front of the work implement 3 of the vehicle model M1.

The second image generation unit 29 generates a first work implement composite image Isa by carrying out projective transformation on the image Ima of the front surface of the work implement 3. The second image generation unit 29 synthesizes the first work implement composite image Isa with the first plane A21 by texture mapping. Specifically, the second image generation unit 29 carries out projective transformation of the image Ima of the front surface of the work implement 3 using the following equation 1.

$$\begin{pmatrix} u \\ v \\ 1 \end{pmatrix} \sim H_1 \begin{pmatrix} s_1 \\ t_1 \\ 1 \end{pmatrix} \quad \text{(Equation 1)}$$

Figure 10:
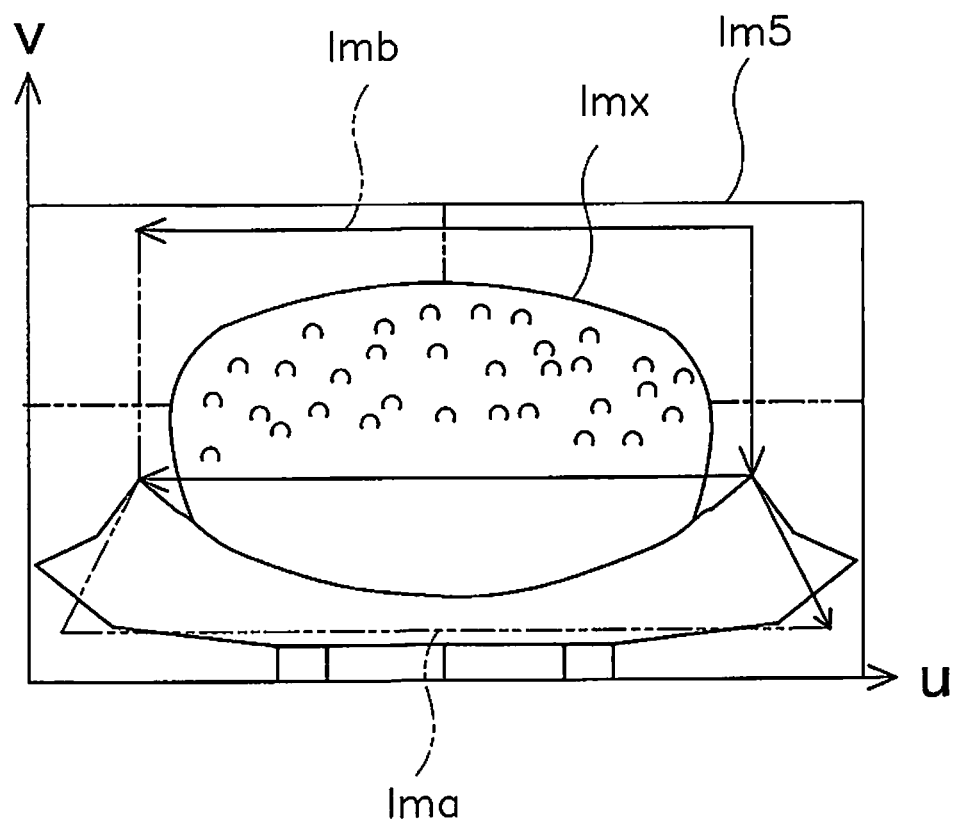
FIG. 10 illustrates processing for generating the work implement composite image by the second image generation unit.

As illustrated in FIG. 10, u and v are coordinates of points on the work implement front image Im5. As illustrated in FIG. 9, s1 and t1 are coordinates of points on the first plane A21. H1 is a projective transformation matrix (referred to below as "first projective transformation matrix") for transforming the image Ima of the front surface of the work implement 3 to an image on the first plane A21, that is, to the first work implement composite image Isa. The "~" symbol in equation 1 and the following equation 2 indicates that the left side and the right side of the equations have an equivalence relationship.

Moreover, the second image generation unit 29 generates a second work implement composite image Isb by carrying out projective transformation on the image Imb of the ground surface of the work implement front image Im5. The second image generation unit 29 synthesizes the second work implement composite image Isb with the second plane A22 by texture mapping. Specifically, the second image generation unit 29 carries out projective transformation of the image Imb of the ground surface of the work implement front image Im5 using the following equation 2.

$$\begin{pmatrix} u \\ v \\ 1 \end{pmatrix} \sim H_2 \begin{pmatrix} s_2 \\ t_2 \\ 1 \end{pmatrix} \quad \text{(Equation 2)}$$

As illustrated in FIG. 9, s2 and t2 are coordinates of points on the second plane A22. H2 is a projective transformation matrix (referred to below as "second projective transformation matrix") for transforming the image Imb of the ground surface of the work implement front image Im5 to an image on the second plane A22, that is, to the second work implement composite image Isb.

The first projective transformation matrix H1 and the second projective transformation matrix H2 are both three row by three column matrices. The first projective transformation matrix H1 and the second projective transformation matrix H2 are determined previously on the basis of the positional relationship between the second image capturing unit 22 and the work vehicle 1, and stored in the storage unit 26 as second projection plane data D2.

Figure 11:
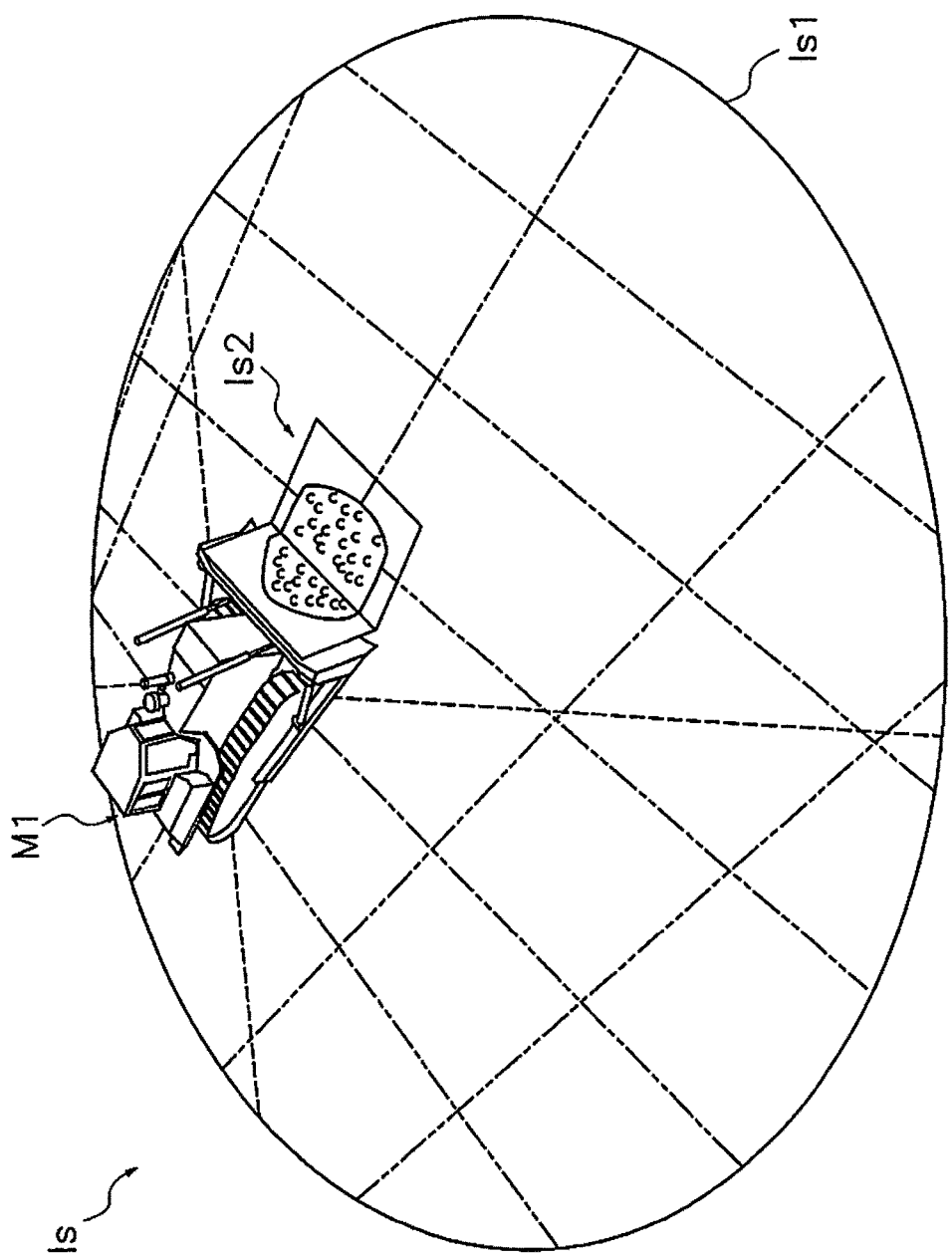
FIG. 11 illustrates an example of a display image.

The display unit 27 displays the display image Is. FIG. 11 illustrates an example of the display image Is. As illustrated in FIG. 11, the display image Is displays the work vehicle 1 and the surroundings thereof in a three-dimensional manner as seen diagonally from in front and from above. The display image Is includes the vehicle model M1, the surroundings composite image Is1, and the work implement composite image Is2 generated as described above. Specifically, the condition of the surroundings of the work vehicle 1 captured by the first capturing image unit 21 is displayed as the surroundings composite image Is1 of the surroundings of the vehicle model M1 in the display image Is. Further, the condition of the front of the blade 8 captured by the second image capturing unit 22 is displayed in front of the blade of the vehicle model M1 and on the ground surface therebelow as the work implement composite image Is2. The display image Is is updated in real time and displayed as a video.

The display system 20 according to the present embodiment has the following characteristics.

The vehicle model M1, the surroundings composite image Is1 depicting the surroundings of the work vehicle 1 in a bird's-eye view, and the work implement composite image Is2 depicting the area in front of the work implement 3, are displayed together in the display image Is. As a result, an operator is able to easily understand the conditions of the surroundings of the work vehicle 1 and the conditions of the area in front of the work implement 3 from the display image Is. Further, because the work implement composite image Is2 is synthesized on the surroundings composite image Is1 and the vehicle model M1, the condition of the surroundings of the work vehicle 1 and the condition of the area in front of the work implement 3 can be more easily understood at the same time in comparison to a case in which the image in front of the work implement 3 is displayed separately from the image of the surroundings of the work vehicle 1.

The display image Is displays the work vehicle 1 and the surroundings thereof in a three-dimensional manner as seen diagonally from in front and from above. Accordingly, the conditions of the area in front of the work implement can be understood more accurately in comparison to a case in which the display image Is displays the work vehicle 1 and the surroundings thereof in a two-dimensional manner as seen from directly above.

The first capturing image unit 21 is disposed so as to face outward with respect to the work vehicle 1. As a result, the surroundings composite image Is1 can be generated with greater accuracy. The second image capturing unit 22 is disposed so as to face inward with respect to the work vehicle 1. As a result, the work implement composite image Is2 can be generated with greater accuracy without being blocked by the work implement 3.

The work implement composite image Isa generated from the work implement front image Im5 captured by the second image capturing unit 22 is synthesized with the front surface of the work implement 3 of the vehicle model M1. The second work implement composite image Isb generated from the work implement front image Im5 is synthesized with the ground surface located in front of the work implement 3 of the vehicle model M1 in the surroundings composite image Is1. As a result, the amount and position of the work object X can be understood with greater accuracy due to the work implement composite image Is2.

While an embodiment of the present invention has been described above, the present invention is not limited to the embodiment and the following modifications may be made within the scope of the present invention.

The work vehicle 1 is not limited to a bulldozer, and may be another type of work vehicle 1 such as a wheel loader and the like. The work vehicle 1 may be a vehicle operated remotely or may be a vehicle operated directly by an operator inside the operating cabin 5.

The first projection plane A1 is not limited to a hemispherical plane having a mesh structure and may have a different structure or shape. The second projection plane A2 is not limited to the shape having the first plane A21 and the second plane A22 and may be another shape.

The number of the image capturing devices of the first capturing image unit 21 is not limited to four and may be three or less or five or more. The disposition of the image capturing devices of the first capturing image unit 21 is not limited to the dispositions indicated in the above embodiment and may be disposed differently. The image capturing devices of the first capturing image unit 21 are not limited to fish-eye lens cameras and may be another type of image capturing device.

The number of the image capturing devices of the second image capturing unit 22 is not limited to one and may be two or more. The disposition of the image capturing device of the second image capturing unit 22 is not limited to the disposition indicated in the above embodiment and may be disposed differently.

While the second image capturing unit 22 has an image capturing device with a normal angle of view and is disposed so as to face inward with respect to the work vehicle 1, the second image capturing unit 22 is not limited in this way. If the second image capturing unit 22 is provided with a sufficiently wide angle of view and is able to capture images of the front surface of the work implement 3, the second image capturing unit may be disposed so as to face vertically downward or face outward.

INDUSTRIAL APPLICABILITY

According to the present invention, a display system for a work vehicle, a display control device, a work vehicle, and a display control method are provided that allow for the conditions of the surroundings of the work vehicle and the conditions of the area in front of the work implement to be understood easily.

What is claimed is:

1. A display system for a work vehicle, the display system being configured to display a surrounding environment of the work vehicle having a vehicle body and a work implement disposed in front of the vehicle body, the display system comprising:
    a first camera mounted on the vehicle body and arranged to capture an image of the surroundings of the work vehicle; and
    a second camera disposed above the work implement and capturing an image of an area in front of the work implement, the second camera is disposed further frontward than the work implement;
    a first image generation circuit that generates, from the image captured by the first camera, a surroundings composite image which depicts the surroundings of the work vehicle in a bird's-eye view and is synthesized with a vehicle model depicting the work vehicle;
    a second image generation circuit that generates, from the image captured by the second camera, a work implement composite image which depicts the area in front of the work implement and is synthesized with the vehicle model and the surroundings composite image; and
    a display that displays a display image including the vehicle model, the surroundings composite image, and the work implement composite image.

2. The display system for a work vehicle according to claim 1, wherein
    the display image displays the work vehicle and the surroundings thereof in a three-dimensional manner as seen diagonally from in front and from above.

3. The display system for a work vehicle according to claim 1, wherein:
    the first camera is disposed so as to face outward with respect to the work vehicle, and
    the second camera is disposed so as to face inward with respect to the work vehicle.

4. The display system for a work vehicle according to claim 1, wherein
    the image captured by the second camera includes a front surface of the work implement;
    the second image generation circuit generates the work implement composite image from the image of the front surface of the work implement captured by the second camera; and
    the work implement composite image is synthesized with the front surface of the work implement of the vehicle model.

5. The display system for a work vehicle according to claim 1, wherein
    the image captured by the second camera includes a ground surface located in front of the work implement;

the second image generation circuit generates the work implement composite image from the image of the ground surface captured by the second camera; and the work implement composite image is synthesized with the ground surface located in front of the work implement of the vehicle model in the surroundings composite image.

6. The display system for a work vehicle according to claim 1, wherein
the first image generation circuit generates the surroundings composite image by projecting the image captured by the first camera onto a first projection plane disposed so as to enclose the vehicle model.

7. The display system for a work vehicle according to claim 6, wherein
the first projection plane is hemispherical and has a mesh structure.

8. The display system for a work vehicle according to claim 1, wherein
the second image generation circuit generates the work implement composite image by projecting the image captured by the second camera onto a second projection plane disposed on the front surface of the work implement of the vehicle model and on the ground surface located in front of the work implement of the vehicle model.

9. The display system for a work vehicle according to claim 8, wherein
the second projection plane includes
a first plane along the front surface of the work implement of the vehicle model, and
a second plane along the ground surface located in front of the work implement of the vehicle model.

10. The display system for a work vehicle according to claim 1, wherein
a plurality of the first camera is attached to the vehicle body.

11. The display system for a work vehicle according to claim 10, wherein
the plurality of the first camera includes
a camera arranged to capture an image forward of the vehicle body,
a camera arranged to capture an image leftward of the vehicle body,
a camera arranged to capture an image rightward of the vehicle body, and
a camera arranged to capture an image rearward of the vehicle body.

12. The display system for a work vehicle according to claim 10, wherein
the first cameras are fish-eye lens cameras.

13. A display system for a work vehicle, the display system being configured to display a surrounding environment of the work vehicle having a vehicle body and a work implement disposed in front of the vehicle body, the display system comprising:
a first camera mounted on the vehicle body and arranged to capture an image of the surroundings of the work vehicle; and
a second camera disposed above the work implement and capturing an image of an area in front of the work implement, the image captured by the second camera including a front surface of the work implement and a ground surface located in front of the work implement;
a first image generation circuit that generates, from the image captured by the first camera, a surroundings composite image which depicts the surroundings of the work vehicle
in a bird's-eye view and is synthesized with a vehicle model depicting the work vehicle;
a second image generation circuit that generates, from the image captured by the second camera, a work implement composite image which depicts the area in front of the work implement and is synthesized with the vehicle model and the surroundings composite image; and
a display that displays a display image including the vehicle model, the surroundings composite image, and the work implement composite image,
the work implement composite image including a first work implement composite image and a second work implement composite image,
the second image generation circuit generating the first work implement composite image from the image of the front surface of the work implement captured by the second camera,
the second image generation circuit generating the second work implement composite image from the image of the ground surface captured by the second camera,
the first work implement composite image being synthesized with the front surface of the work implement of the vehicle model, and
the second work implement composite image being synthesized with the ground surface located in front of the work implement of the vehicle model in the surroundings composite image.

14. A display control device for a work vehicle, the display control device being configured to display a surrounding environment of the work vehicle having a vehicle body and a work implement disposed in front of the vehicle body, the display control device comprising:
an image acquiring circuit that acquires
an image of the surroundings of the vehicle body from a first camera mounted on the vehicle body, and
an image of an area in front of the work implement from a second camera disposed above and further frontward than the work implement, the image captured by the second camera including a front surface of the work implement;
a first image generation circuit that generates, from the image captured by the first camera, a surroundings composite image which depicts the surroundings of the work vehicle from a bird's-eye view and is synthesized with a vehicle model depicting the work vehicle;
a second image generation circuit that generates, from the image captured by the second camera, a work implement composite image which depicts an area in front of the work implement and is synthesized with the front surface of the work implement of the vehicle model and the surroundings composite image; and
a display that displays a display image that includes the vehicle model, the surroundings composite image, and the work implement composite image.

15. A work vehicle comprising:
a vehicle body;
a work implement disposed in front of the vehicle body;
a first camera mounted on the vehicle body and capturing an image of the surroundings of the work vehicle; and
a second camera disposed above the work implement and capturing an image of an area in front of the work implement, the first camera being disposed so that an image capturing direction faces outward with respect to the vehicle body;

the second camera being disposed so that an image capturing direction faces inward with respect to the vehicle body.

16. A display control method for a work vehicle, the display control method being useable to display a surrounding environment of the work vehicle having a vehicle body and a work implement disposed in front of the vehicle body, the display control method comprising:

acquiring an image of the surroundings of the vehicle body from a first camera mounted on the vehicle body;

acquiring an image of an area in front of the work implement from a second camera disposed above and further frontward than the work implement, the image captured by the second camera including a front surface of the work implement;

generating, from the image acquired from the first camera, a surroundings composite image which depicts the surroundings of the work vehicle from a bird's-eye view and is synthesized with a vehicle model depicting the work vehicle;

generating, from the image acquired from the second camera, a work implement composite image which depicts an area in front of the work implement and is synthesized with the front surface of the work implement of the vehicle model and the surroundings composite image; and displaying a display image that includes the vehicle model, the surroundings composite image, and the work implement composite image.

17. A display control device for a work vehicle, the display control device being configured to display a surrounding environment of the work vehicle having a vehicle body and a work implement disposed in front of the vehicle body, the display control device comprising:

an image acquiring circuit that acquires
an image of the surroundings of the vehicle body from a first camera mounted on the vehicle body, and
an image of an area in front of the work implement from a second camera disposed above the work implement, the image captured by the second camera including a frontmost surface of the work implement;

a first image generation circuit that generates, from the image captured by the first camera, a surroundings composite image which depicts the surroundings of the work vehicle from a bird's-eye view and is synthesized with a vehicle model depicting the work vehicle;

a second image generation circuit that generates, from the image captured by the second camera, a work implement composite image which depicts an area in front of the work implement and is synthesized with the frontmost surface of the work implement of the vehicle model and the surroundings composite image; and a display that displays a display image that includes the vehicle model, the surroundings composite image, and the work implement composite image.

18. A display control method for a work vehicle, the display control method being useable to display a surrounding environment of the work vehicle having a vehicle body and a work implement disposed in front of the vehicle body, the display control method comprising:

acquiring an image of the surroundings of the vehicle body from a first camera mounted on the vehicle body;

acquiring an image of an area in front of the work implement from a second camera disposed above the work implement, the image captured by the second camera including a frontmost surface of the work implement;

generating, from the image acquired from the first camera, a surroundings composite image which depicts the surroundings of the work vehicle from a bird's-eye view and is synthesized with a vehicle model depicting the work vehicle;

generating, from the image acquired from the second camera, a work implement composite image which depicts an area in front of the work implement and is synthesized with the frontmost surface of the work implement of the vehicle model and the surroundings composite image; and displaying a display image that includes the vehicle model, the surroundings composite image, and the work implement composite image.

19. A display control device for a work vehicle, the display control device being configured to display a surrounding environment of the work vehicle having a vehicle body and a work implement disposed in front of the vehicle body, the display control device comprising:

an image acquiring circuit that acquires
an image of the surroundings of the vehicle body from a first camera mounted on the vehicle body, and
an image of an area in front of the work implement from a second camera disposed above the work implement, the image captured by the second camera including a front surface of the work implement and a ground surface located in front of the work implement;

a first image generation circuit that generates, from the image captured by the first camera, a surroundings composite image which depicts the surroundings of the work vehicle from a bird's-eye view and is synthesized with a vehicle model depicting the work vehicle;

a second image generation circuit that generates, from the image captured by the second camera, a work implement composite image which depicts an area in front of the work implement and is synthesized with the front surface of the work implement of the vehicle model and the surroundings composite image; and a display that displays a display image that includes the vehicle model, the surroundings composite image, and the work implement composite image, the work implement composite image including a first work implement composite image and a second work implement composite image, the second image generation circuit generating the first work implement composite image from the image of the front surface of the work implement captured by the second camera, the second image generation circuit generating the second work implement composite image from the image of the ground surface captured by the second camera, the first work implement composite image being synthesized with the front surface of the work implement of the vehicle model, and the second work implement composite image being synthesized with the ground surface located in front of the work implement of the vehicle model in the surroundings composite image.

20. A display control method for a work vehicle, the display control method being useable to display a surrounding environment of the work vehicle having a vehicle body and a work implement disposed in front of the vehicle body, the display control method comprising:

acquiring an image of the surroundings of the vehicle body from a first camera mounted on the vehicle body;

acquiring an image of an area in front of the work implement from a second camera disposed above the work implement, the image captured by the second camera including a front surface of the work implement and a ground surface located in front of the work implement;

generating, from the image acquired from the first camera, a surroundings composite image which depicts the surroundings of the work vehicle from a bird's-eye view and is synthesized with a vehicle model depicting the work vehicle;

generating, from the image acquired from the second camera, a work implement composite image which depicts an area in front of the work implement and is synthesized with the front surface of the work implement of the vehicle model and the surroundings composite image; and displaying a display image that includes the vehicle model, the surroundings composite image, and the work implement composite image, the generating of the work implement composite image including generating a first work implement composite image and a second work implement composite image, the first work implement composite image being generated from the image of the front surface of the work implement captured by the second camera, the second work implement composite image being generated from the image of the ground surface captured by the second camera, the first work implement composite image being synthesized with the front surface of the work implement of the vehicle model, and the second work implement composite image being synthesized with the ground surface located in front of the work implement of the vehicle model in the surroundings composite image.

* * * * *